US009471262B2

(12) United States Patent
Tamari

(10) Patent No.: US 9,471,262 B2
(45) Date of Patent: Oct. 18, 2016

(54) SYSTEMS, METHODS AND COMPUTER-READABLE MEDIA FOR NETWORK PRINTING WITH USER-SELECTABLE OPTIONS

(75) Inventor: Yusuke Tamari, Riverdale, NJ (US)

(73) Assignee: Ricoh Company Ltd., Tokyo (JP)

( * ) Notice: Subject to any disclaimer, the term of this patent is extended or adjusted under 35 U.S.C. 154(b) by 694 days.

(21) Appl. No.: 13/408,832

(22) Filed: Feb. 29, 2012

(65) Prior Publication Data
US 2013/0226695 A1   Aug. 29, 2013

(51) Int. Cl.
*G06F 3/12* (2006.01)
*G06Q 30/02* (2012.01)

(52) U.S. Cl.
CPC ............ *G06F 3/1206* (2013.01); *G06F 3/126* (2013.01); *G06F 3/1288* (2013.01); *G06Q 30/02* (2013.01)

(58) Field of Classification Search
CPC .................... G06Q 30/0207; G06Q 30/0241; G06Q 30/0208; G06Q 30/0222; G06Q 30/0238; G06Q 30/0251; G06Q 30/0253; G06Q 30/0255; G06Q 30/0256; G06Q 30/0257; G06Q 30/0261; G06Q 30/0268; G06Q 30/0269; G06Q 30/0271; G06Q 30/0276; G06F 21/30; G06F 21/31; G06F 21/44; G06F 3/1287; G06F 3/1288; G06F 3/1292; G06F 3/126; G06F 3/1272; G06F 3/1243; H04N 1/32101; H04N 1/32133; H04N 1/34; H04N 1/342; H04N 1/344; H04N 1/4413; H04N 1/444; H04N 1/00132; H04N 1/00143; H04N 1/00145; H04N 1/00177; H04N 1/00188; H04N 1/002; H04N 1/04; H04N 1/00244
USPC ....... 358/1.13, 1.15, 1.18, 401, 403; 705/16, 705/17, 18, 21, 51, 52, 53, 55, 80, 1.1, 26.2, 705/14.1, 14.11, 14.15, 14.17, 14.19, 14.23, 705/14.25, 14.36, 14.37, 14.38, 14.39, 14.4, 705/9, 14.5, 14.51, 14.55, 14.57, 14.58, 705/14.64, 14.65, 14.66, 14.67, 14.69, 14
See application file for complete search history.

(56) References Cited

U.S. PATENT DOCUMENTS 6,748,471 B1   6/2004   Keeney et al.
6,859,832 B1   2/2005   Gecht et al.
(Continued)

OTHER PUBLICATIONS

National Institute of Standards and Technology Special Publication 800-145 7 pages (Sep. 2011).*

*Primary Examiner* — Mohammad Ghayour
*Assistant Examiner* — Jonathan R Beckley
(74) *Attorney, Agent, or Firm* — Harness, Dickey & Pierce, P.L.C.

(57) ABSTRACT

Example embodiments are directed to systems, methods, and computer-readable media for providing a cloud print service, wherein when a user of a terminal device chooses a pay-to-print option, a print service provider is configured to send an uploaded print job to a print apparatus via a public network after receiving monetary payment from the user, and when the user chooses a free-print-with-advertisement option, the print service provider is configured to select a user-targeted advertisement, modify the uploaded print job with the selected user-targeted advertisement, and send the modified print job to the print apparatus via the public network.

19 Claims, 11 Drawing Sheets

(56) References Cited

U.S. PATENT DOCUMENTS

| | | | |
|---|---|---|---|
| 6,882,439 B2* | 4/2005 | Ishijima | G06Q 30/02 358/1.1 |
| 6,891,635 B2* | 5/2005 | Dutta | 358/1.15 |
| 6,917,440 B2* | 7/2005 | Kondo et al. | 358/1.15 |
| 6,972,861 B1* | 12/2005 | van Zee et al. | 358/1.15 |
| 6,978,299 B1 | 12/2005 | Lodwick | |
| 6,999,190 B2* | 2/2006 | Shimbori et al. | 358/1.15 |
| 7,013,288 B1* | 3/2006 | Reifel | G06Q 10/00 705/14.1 |
| 7,093,046 B2 | 8/2006 | Keeney et al. | |
| 7,095,518 B1 | 8/2006 | Keeney et al. | |
| 7,343,438 B2 | 3/2008 | Keeney et al. | |
| 7,460,265 B2 | 12/2008 | Keeney et al. | |
| 7,528,974 B2 | 5/2009 | Gecht et al. | |
| 7,552,207 B2 | 6/2009 | Gecht et al. | |
| 7,574,545 B2 | 8/2009 | Keeney et al. | |
| 7,574,546 B2 | 8/2009 | Keeney et al. | |
| 7,587,468 B2 | 9/2009 | Tenenbaum | |
| 7,634,425 B2* | 12/2009 | Satomi | G06Q 20/20 705/16 |
| 7,653,683 B2 | 1/2010 | Armstrong et al. | |
| 7,827,293 B2 | 11/2010 | Spicer et al. | |
| 7,904,594 B2 | 3/2011 | Spicer et al. | |
| 7,941,504 B2 | 5/2011 | Gershom | |
| 7,949,560 B2* | 5/2011 | Peeters et al. | 705/14.39 |
| 8,645,210 B2* | 2/2014 | Lee | G06Q 30/0238 358/1.12 |
| 2001/0025274 A1* | 9/2001 | Zehr et al. | 705/402 |
| 2001/0030773 A1* | 10/2001 | Matsuura et al. | 358/471 |
| 2002/0057451 A1* | 5/2002 | Ishijima | G06Q 30/02 358/1.15 |
| 2003/0137690 A1 | 7/2003 | Hoover et al. | |
| 2004/0036912 A1 | 2/2004 | Liou et al. | |
| 2004/0039641 A1* | 2/2004 | Satomi | G06Q 20/20 705/14.64 |
| 2005/0216483 A1 | 9/2005 | Armstrong et al. | |
| 2005/0216562 A1 | 9/2005 | Armstrong et al. | |
| 2005/0216575 A1 | 9/2005 | Armstrong et al. | |
| 2005/0216602 A1 | 9/2005 | Armstrong et al. | |
| 2006/0114494 A1 | 6/2006 | Crosby et al. | |
| 2007/0294335 A1 | 12/2007 | Gershom | |
| 2008/0091800 A1* | 4/2008 | Sorrentino et al. | 709/219 |
| 2010/0161725 A1 | 6/2010 | Gershom | |
| 2011/0138076 A1 | 6/2011 | Spicer et al. | |
| 2011/0208864 A1 | 8/2011 | St. Laurent et al. | |
| 2011/0209211 A1 | 8/2011 | Kuindersma et al. | |
| 2014/0092429 A1* | 4/2014 | Srinivasmurthy et al. | 358/1.15 |

* cited by examiner

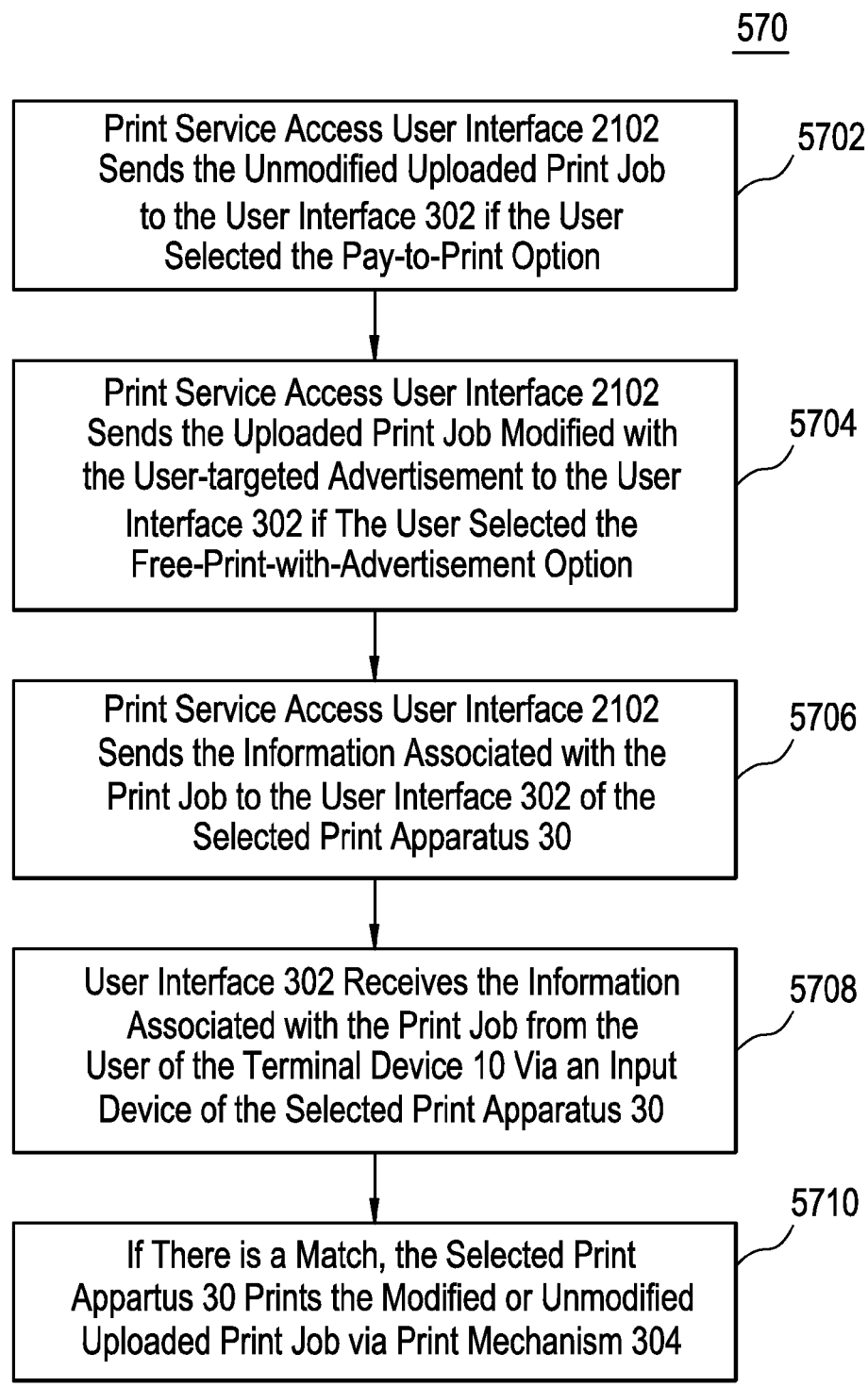

SYSTEMS, METHODS AND COMPUTER-READABLE MEDIA FOR NETWORK PRINTING WITH USER-SELECTABLE OPTIONS

BACKGROUND

1. Field of the Invention

The invention relates generally to network printing (e.g., "cloud printing") and more specifically relates to systems, methods and computer-readable media for improved network printing using a printing system (e.g., a multi-function printer, scanner, copier device, etc.) by enabling the user to select options, for example, payment options.

2. Discussion of Related Art

"Cloud computing" generally encompasses processing and/or storage of data based on the Internet or based on an enterprise intra-net. For example, cloud computing may encompass the concepts of Software as a Service (SaaS), cloud storage, and cloud printing. SaaS provides an application as a service for a customer to use on demand. Cloud storage generally encompasses the concept of providing/delivering data storage as a service, with the customer being billed for storage usage under a utility computing model (similar to traditional public utilities including electricity). Cloud printing generally encompasses a client process accessing a document from a cloud storage server and causing the document to print. As with cloud storage, a cloud printing user could be charged for the number of pages processed and/or printed. Often the client process in such cloud printing is the printing system itself on which a user interface allows a user to select a document to be retrieved and printed.

However, conventional cloud printing techniques do not offer much flexibility in the manner in which users pay for the documents printed.

SUMMARY

Example embodiments are directed to systems, methods, and computer-readable media for providing a cloud print service, wherein when a user of a terminal device chooses a pay-to-print option, a print service provider is configured to send an uploaded print job to a print apparatus via a public network after receiving monetary payment from the user, and when the user chooses a free-print-with-advertisement option, the print service provider is configured to select a user-targeted advertisement, modify the uploaded print job with the selected user-targeted advertisement, and send the modified print job to the print apparatus via the public network.

In example embodiments, the user-targeted advertisement may relate to the location of the user of the terminal device based on real time information, for example, GPS, or based on known billing information or IP address of the user and or the terminal device 10. In example embodiments, the user-targeted advertisement is selected or modified based on personal interest information retrieved from an e-mail account or social media site of the user which reflects the behavior of the user. In example embodiments, the user-targeted advertisement is selected or modified based on personal interest information retrieved from an e-mail account or social media site of the user and geographic information. In example embodiments, if the user reads the user-targeted advertisement from the terminal device and goes to a sponsor website, then the sponsor will return a monetary return to the operator of the print service provider.

Example embodiments are directed to a system for providing a cloud print service, comprising: a print service provider, connected to a public network, configured to provide a print service access user interface through the public network to a terminal device, and receive and store a print job uploaded through the print service access user interface from the terminal device via the public network and information associated with the print job through the public network to the print service access user interface on the terminal device; a print apparatus including a user interface configured to receive a user entry of the information associated with the print job, and when the information associated with the print job is entered, communicate the information associated with the print job to the print service provider, receive the print job from the print service provider, via the public network, in response to the information associated with the print job transmitted to the print service provider, and process the print job to generate a print output based on the processed print job; the print service provider including a payment selection interface, configured to provide a pay-to-print option and a free-print-with-advertisement option; and when the user chooses the pay-to-print option, the print service provider is configured to send the uploaded print job to the print apparatus via the public network after receiving monetary payment from the user, and when the user chooses the free-print-with-advertisement option, the print service provider is configured to select a user-targeted advertisement, modify the uploaded print job with the selected user-targeted advertisement, and send the modified print job to the print apparatus via the public network.

In example embodiments, the information associated with the print job is a release code.

In example embodiments, the user-targeted advertisement is printed on the print output.

In example embodiments, the user-targeted advertisement includes a bar code symbol.

In example embodiments, the bar code symbol is a quick response (QR) symbol that links to an advertiser website.

In example embodiments, the user-targeted advertisement includes a coupon redeemable at an advertiser establishment.

In example embodiments, the print service access interface includes an authentication interface configured to receive user credentials of the user from the terminal device via the public network and authenticate the user.

In example embodiments, the user credentials are a login and password.

In example embodiments, the print service access interface includes a geographic interface configured to receive user geographic information of the user from the terminal device via the public network.

In example embodiments, wherein the print service provider is configured to select the print apparatus from a plurality of available print apparatuses of the cloud print service based on the user geographic information from the geographic interface.

In example embodiments, the geographic interface determines the user geographic information by at least one of internet protocol (IP) address and mobile device billing address.

In example embodiments, the geographic interface determines the user geographic information by real-time position information.

In example embodiments, the payment selection interface includes a payment interface configured to receive user payment information from the terminal device via the public network when the user selects the pay-to-print option.

In example embodiments, the payment selection interface includes a user-targeted advertisement interface configured to receive user preference information from the terminal device via the public network and select the user-targeted advertisement based on the user preference information when the user selects the free-print-with-advertisement option.

In example embodiments, the user preference information is collected from the user.

In example embodiments, the user preference information is collected from social media.

In example embodiments, the print service access interface further includes a geographic interface configured to receive user geographic information of the user from the terminal device via the public network and select the user-targeted advertisement based on the user geographic information.

In example embodiments, the payment interface further receives monetary payment from the advertiser of the user-targeted advertisement in exchange for the user-targeted advertisement.

Example embodiments are directed to a method of printing to a cloud print service, comprising: receiving and storing a print job uploaded from an authenticated user from a terminal device via a public network; offering a pay-to-print option and a free-print-with-advertisement option to the authenticated user via the terminal device and the public network to print the uploaded print job on a print apparatus of the cloud print service; if the user selects the pay-to-print option, collecting payment from the user via the user device and the public network, sending the uploaded print job to the print apparatus, and providing information associated with the uploaded print job via the public network and the terminal device to enable the authenticated user to print the uploaded print job on the print apparatus; and if the user selects the free-print-with-advertisement option, selecting a user-targeted advertisement, modifying the uploaded print job with the selected user-targeted advertisement, sending the modified uploaded print job to the print apparatus, and providing information associated with the modified uploaded print job via the public network and the terminal device to enable the authenticated user to print the modified uploaded print job on the print apparatus.

Example embodiments are directed to a computer-readable medium having software code thereon which, when executed by a computer, cause the computer to receive and store a print job uploaded from an authenticated user from a terminal device via a public network; offer a pay-to-print option and a free-print-with-advertisement option to the authenticated user via the terminal device and the public network to print the uploaded print job on a print apparatus of the cloud print service; if the user selects the pay-to-print option, collect payment from the user via the user device and the public network, send the uploaded print job to the print apparatus, and provide information associated with the uploaded print job via the public network and the terminal device to enable the authenticated user to print the uploaded print job on the print apparatus; and if the user selects the free-print-with-advertisement option, selecting a user-targeted advertisement, modify the uploaded print job with the selected user-targeted advertisement, send the modified uploaded print job to the print apparatus, and provide information associated with the modified uploaded print job via the public network and the terminal device to enable the authenticated user to print the modified uploaded print job on the print apparatus.

BRIEF DESCRIPTION OF THE DRAWINGS

The same reference number represents the same element or same type of element on all drawings.

FIG. 11 illustrates the print operation of FIG. 4 in example embodiments in more detail.

DETAILED DESCRIPTION OF EXAMPLE EMBODIMENTS

Figure 1:
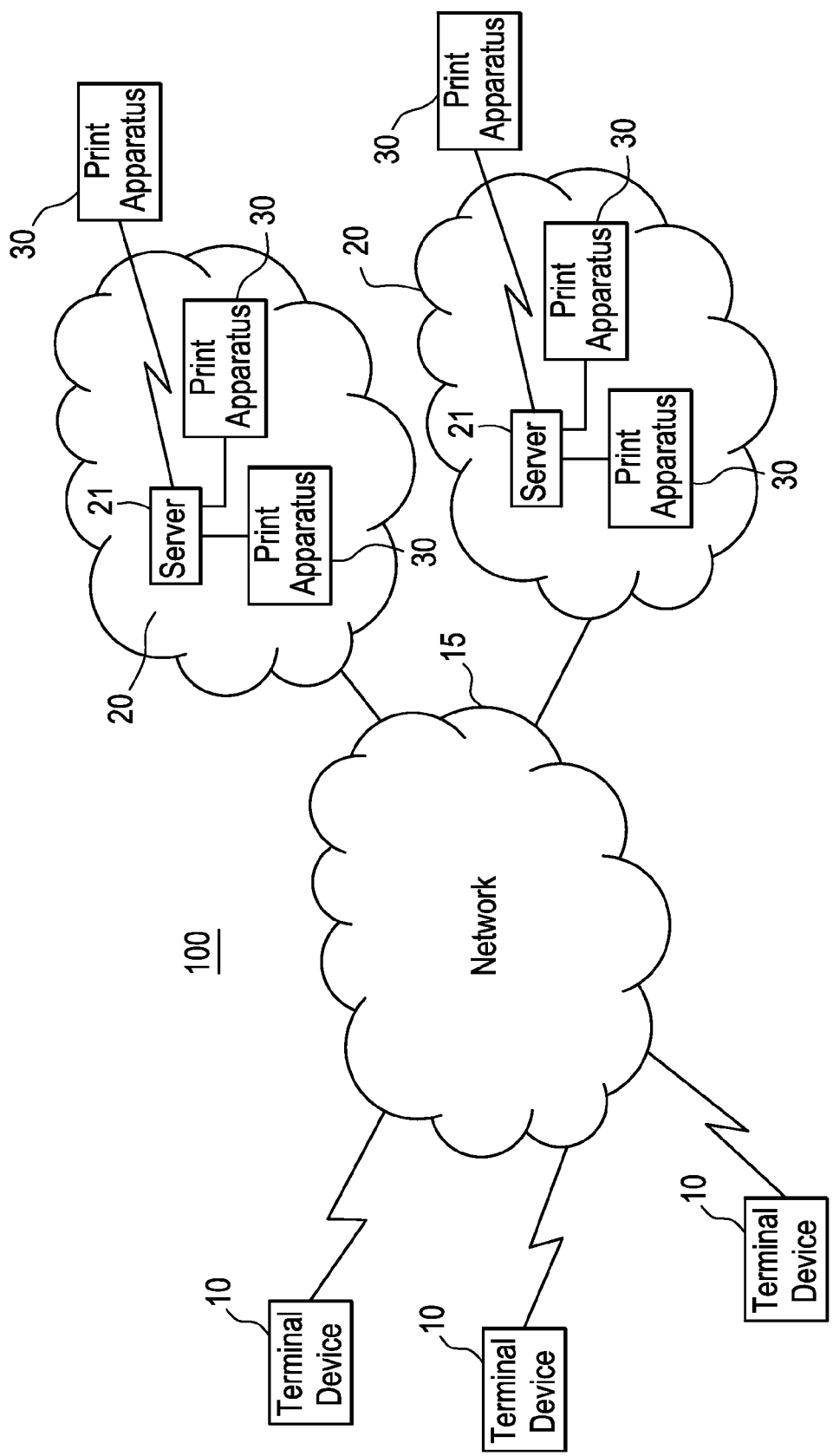
FIG. 1 illustrates an example system implementing the cloud-based printing in accordance with example embodiments.

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 illustrates an example system 100 implementing the cloud-based printing in accordance with example embodiments.

As shown in FIG. 1, the system 100 may include one or more terminal devices 10, one or more networks 15, and one or more clouds 20. In example embodiments, the cloud 20 may include one or more servers 21 and one or more print apparatuses 30. In example embodiments, the terminal device 10 attempts to utilize one or more capabilities of the cloud 20, for example, to print a document at one or more print apparatuses 30, located within or outside the cloud 20. In example embodiments, the one or more print apparatuses 30 are cloud-enabled printers.

Terminal devices 10 may be a variety of different types of devices. For example, in system 100, terminal device 10 may be a laptop or netbook computer, a cellular or other wireless phone (e.g., a smartphone), a tablet or notepad computer, a desktop computer, or a television or other display device. The terminal devices 10 illustrated in system 100 are examples of devices, and various other types of devices can also be included in system 100.

Figure 2:
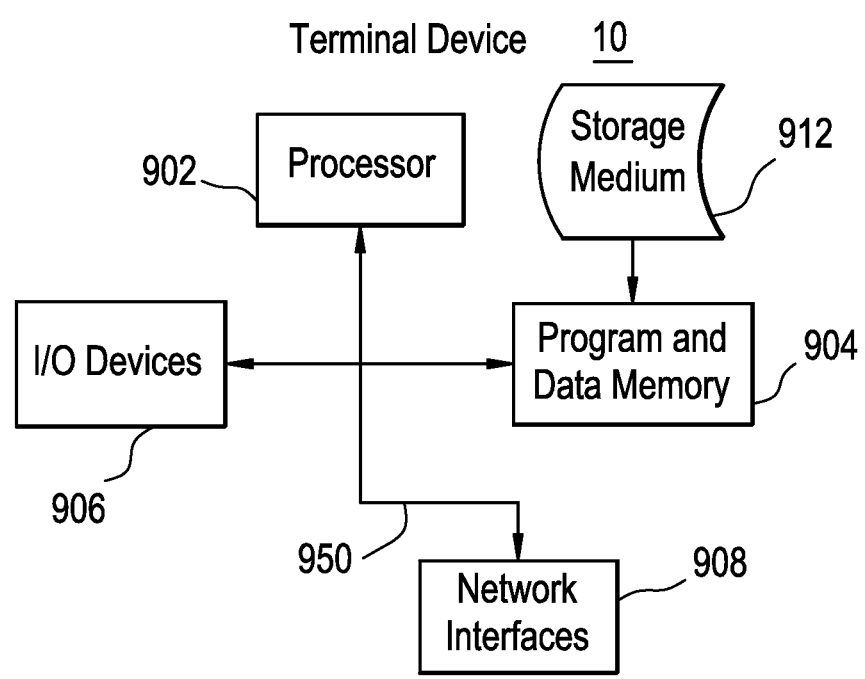
FIG. 2 is a block diagram depicting a terminal device in accordance with example embodiments.

FIG. 2 is an example block diagram depicting a terminal device 10 adapted to provide features and aspects hereof by executing programmed instructions and accessing data stored on a computer readable storage medium 912 for implementing one or more of the methods depicted herein. A terminal device 10 suitable for storing and/or executing program code may include at least one processor 902 coupled directly or indirectly to memory elements 904 through a system bus 950. The memory elements 904 can include local memory employed during actual execution of the program code, bulk storage, and cache memories, which provide temporary storage of at least some program code in order to reduce the number of times code must be retrieved from bulk storage during execution.

Input/output or I/O devices 906 (including but not limited to keyboards, displays, pointing devices, etc.) can be coupled to the system either directly or through intervening I/O controllers. Network adapter interfaces 908 may also be coupled to the system to enable the computer system 900 to be coupled with other data processing systems or storage devices through intervening private or public networks. Ethernet cards, WiFi interfaces, Bluetooth Interfaces, are just a few of the currently available types of network or host interface adapters.

Network 15 may be a variety of different networks, including the Internet, a local area network (LAN), a wide area network (WAN), a personal area network, a public network, a private network, a hybrid network, a cellular or other phone network, an intranet, other public and/or proprietary networks, combinations thereof, and so forth. It should be noted that network 15 can be configured to include multiple networks.

Server 21 may be a variety of different types of devices including any combination of processors and memory. Server 21 may be an application server that runs the applications described herein.

Print apparatuses 30 may be a variety of different types of devices including multi-function printers, scanners, copier devices, etc.

Figure 3:
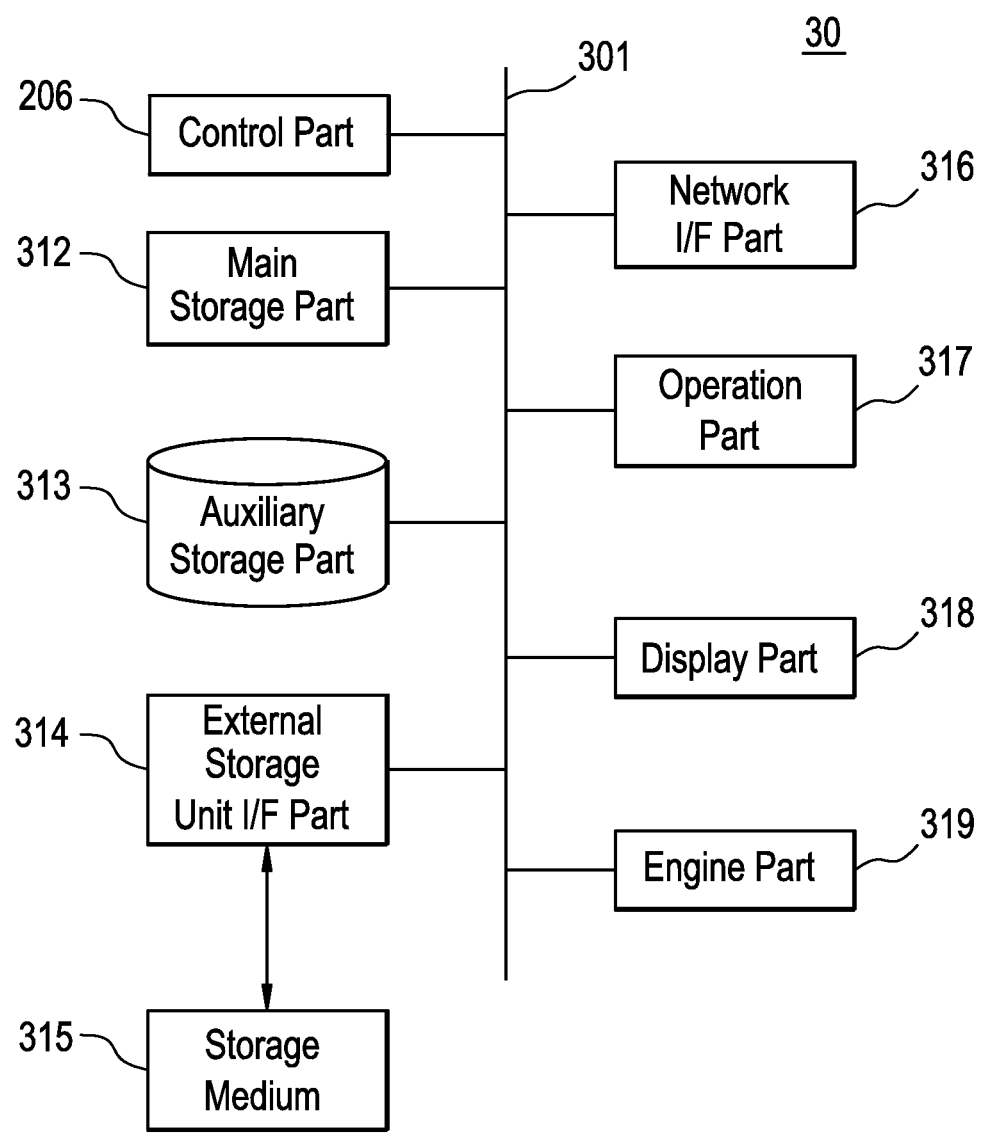
FIG. 3 is a block diagram depicting a print apparatus in accordance with example embodiments.

FIG. 3 is an example block diagram depicting a print apparatus 30 adapted to provide features and aspects hereof by executing programmed instructions and accessing data stored on a computer readable storage medium for implementing one or more of the methods depicted herein. A print apparatus 30 suitable for storing and/or executing program code may include control part 206, a main storage part 312, an auxiliary storage part 313, an external storage unit I/F (interface) part 314, a network I/F part 316, an operation part 317, a display part 318 and an engine part 319. These components are connected by a bus 301.

The control part 206 includes a CPU (Central Processing Unit) that controls the other components, and carries out calculation and modification of data in the computer. Further, the control part 206 acts as an arithmetic and logic unit that executes programs stored in the main storage part 312, receives data from the operation part 317, the main storage part 312, the auxiliary storage part 313 and/or a storage medium 315 through the external storage unit I/F part 314, and, after calculation and/or modification of the data, outputs the data as a result of the calculation and/or modification to the display part 318, the engine part 319, the main storage part 312, the auxiliary storage part 313 and/or the storage medium 315 through the external storage unit I/F part 314.

The main storage part 312 includes a ROM (Read Only Memory), a RAM (Random Access Memory) or such, and acts as a storage unit that stores or temporarily holds the programs that the control part 206 executes, such as an OS (Operating System) that is basic software, application software and so forth, and/or data.

The auxiliary storage part 313 includes a HDD (Hard Disk Drive) or such, and is a storage unit that stores data concerning the application software or such. The external storage unit I/F part 314 provides an interface between the storage medium 315 (for example, a flash memory) connected through a data transmission path such as a USB (Universal Serial Bus) and the print apparatus 30.

Further, a given program may be stored in the storage medium 315, the given program stored in the storage medium 315 may be then installed in the print apparatus 30 through the external storage unit I/F part 314, and the print apparatus 30 may execute the installed given program.

The network I/F part 316 provides an interface between a peripheral device, having a communication function and connected through a communication network such as a LAN (Local Area Network) or a WAN (Wide Area Network) which is established by using a data transmission path such as a wire and/or wireless line, and the print apparatus 30.

The operation part 317 and the display part 318 include key switches (hardware keys) and a LCD (Liquid Crystal Display) including a touch panel function (including software keys of a GUI (Graphical User Interface)), and is a display and/or input unit acting as a UI (User Interface) to be used when the functions of the image forming apparatus 1 are used by the user.

In the engine part 319, mechanism parts such as a plotter or a printer which carries out a process concerning actually forming an image, a scanner, respective motors, and so forth, are driven.

In example embodiments the terminal device 10 is a smart phone, for example, a Blackberry, iPhone, or Android based smartphone running its respective operating system, and has an application thereon, which enables cloud printing.

In example embodiments the server 21 is an application server with sufficient processing and memory capability to run an application thereon which enables cloud printing.

In example embodiments the print apparatus 30 is a cloud-enabled printer with sufficient processing and memory capability to run an application thereon which enables cloud printing.

Figure 4:
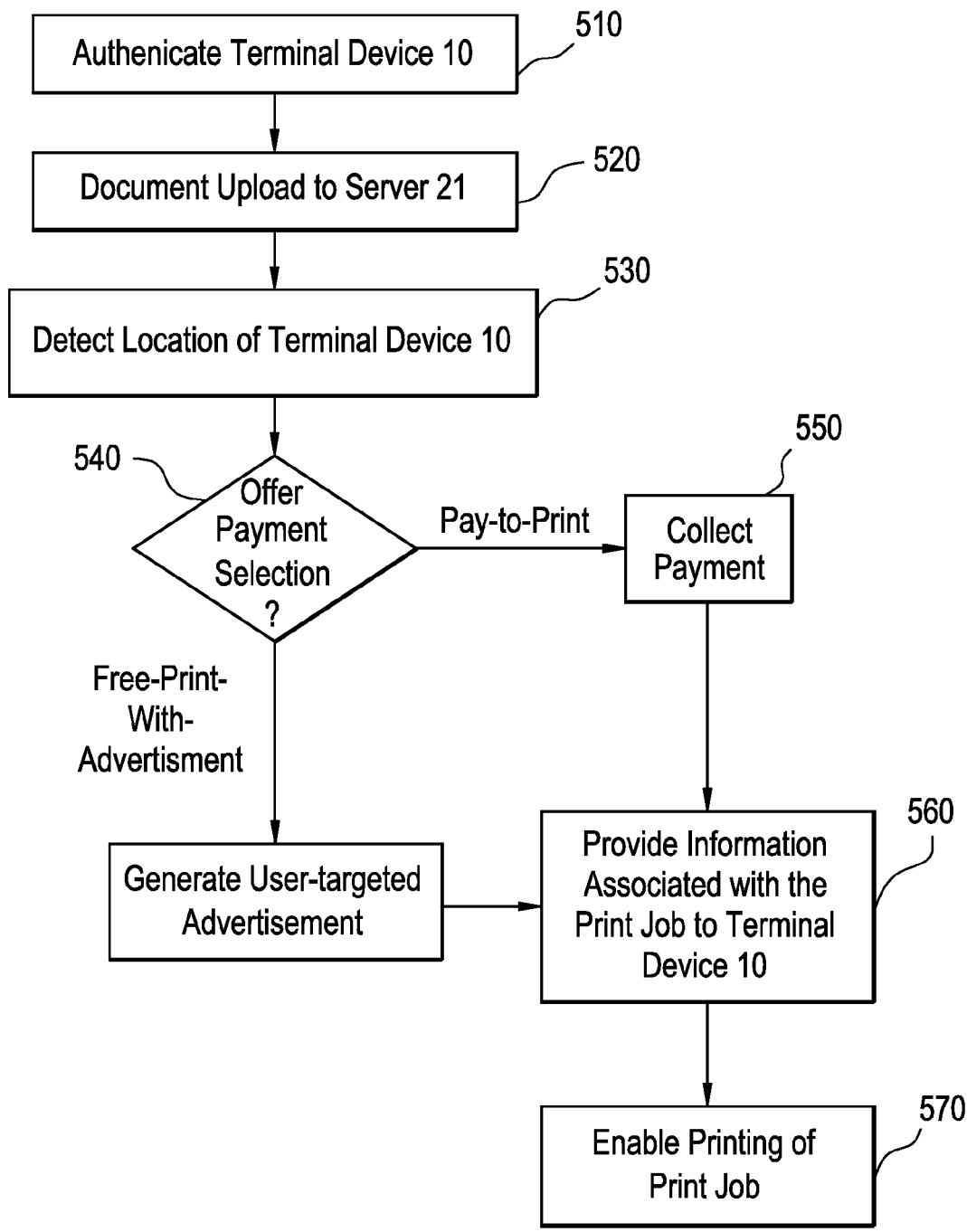
FIG. 4 illustrates an example method implementing the cloud-based printing in accordance with example embodiments.

FIG. 4 illustrates an example method implementing the cloud-based printing in accordance with example embodiments.

In example embodiments, a method of cloud-based printing begins with an authentication operation 510, where the terminal device 10 is authenticated by the server 21, either directly or via one or more third parties. In other example embodiments, the authentication operation 510 may be optional and any cloud-accessible terminal device 10 may be permitted to access the cloud-print resources of cloud 20 without prior authentication.

Assuming the terminal device 10 is properly authenticated (if required), in document upload operation 520, a user of the terminal device uploads the document or documents which constitute the print job, for which cloud printing is being requested.

In detect location operation 530, a location of the terminal device 10 is detected in order determine a location of the terminal device for later processing and in order to determine a print apparatus 30 which is geographically desirable for the user of the terminal device 10.

In payment selection operation 540, a user of the terminal device 10 pays for printing the requested document. In example embodiments, the server 21 offers a pay-to-print option and a free-print-with-advertisement option. If the user of the terminal device 10 selects the pay-to-print option, payment is collected at operation 550, either directly or via one or more third parties, and server 21 provides the user with information associated with the print job at operation 560. In example embodiments, the information associated with the print job is a release code supplied from the server 21 to the terminal device 10 to enable the user of the terminal device 10 to print the print job at the determined print apparatus 30 at operation 570.

If the user of the terminal device 10 selects the free-print-with-advertisement option, a user-targeted advertisement is generated at operation 580, either directly or via one or more third parties, and server 21 provides the user with information associated with the print job at operation 560. In example embodiments, the information associated with the print job is a release code supplied from the server 21 to the terminal device 10 to enable the user of the terminal device 10 to print the print job at the determined print apparatus 30 at operation 570.

Figure 5:
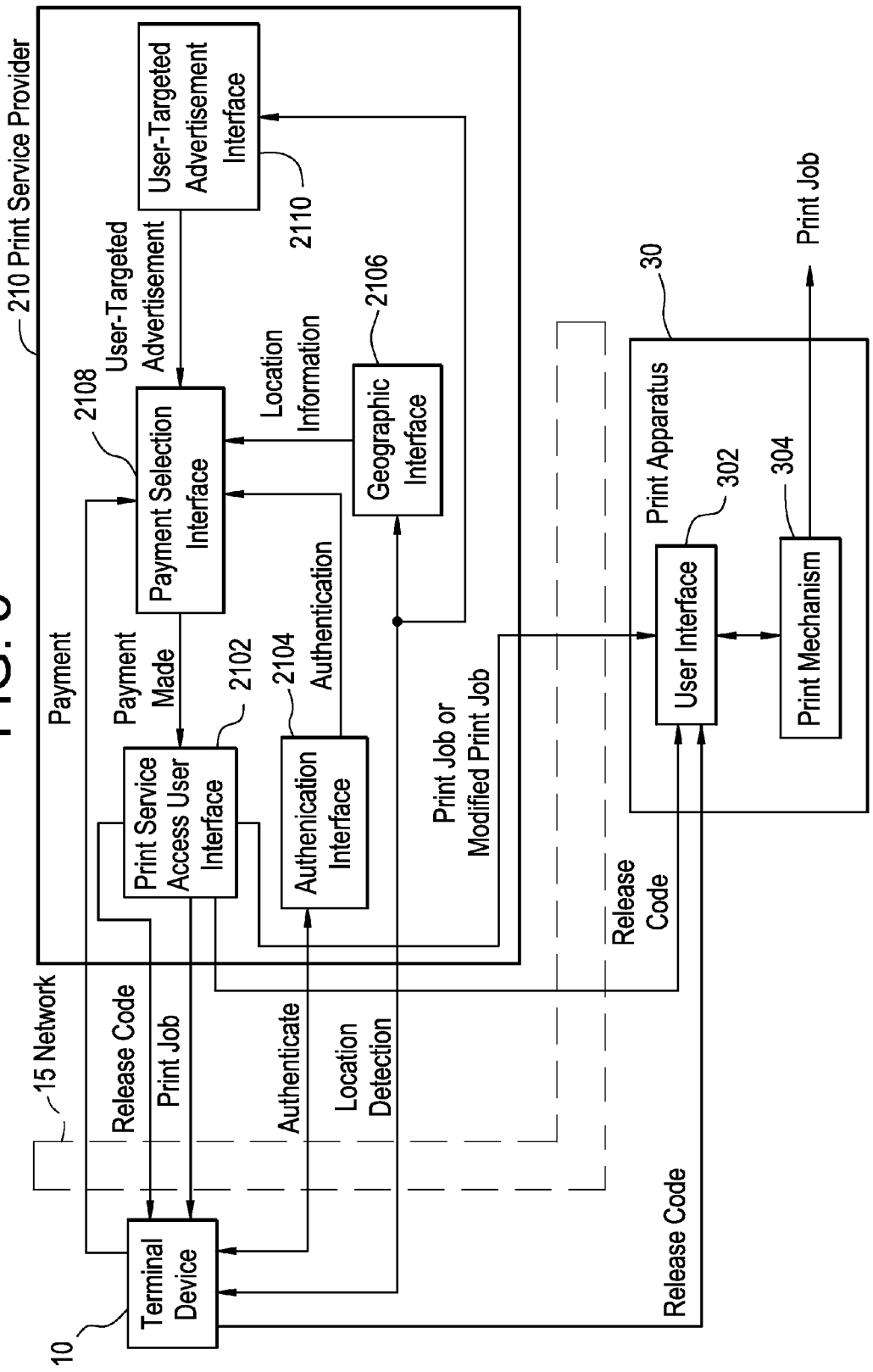
FIG. 5 illustrates an example system implementing the cloud-based printing in accordance with example embodiments in more detail.

FIG. 5 illustrates an example system 100 implementing the cloud-based printing in accordance with example embodiments in more detail. As shown in FIG. 5 the server 21 may include a print service provider 210. The print service provider 210 may further include a print service access user interface 2102, an authentication interface 2104, a geographic interface 2106, a payment selection interface 2108, and a user-targeted advertisement interface 2110. The print apparatus 30 may further include a user interface 302 and a print mechanism 304. Each of the operations described above in FIG. 2 will be described in more detail with respect to FIG. 5.

Figure 6:
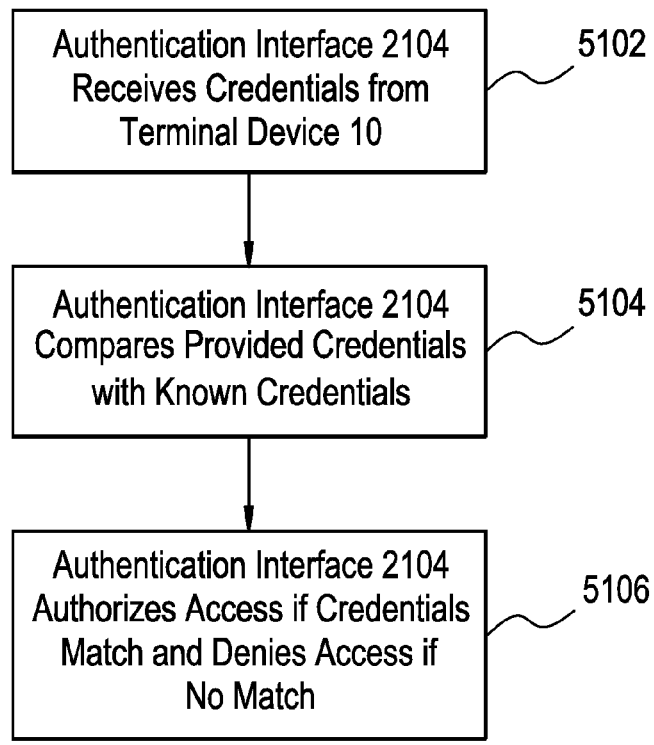
FIG. 6 illustrates the authentication operation of FIG. 4 in example embodiments in more detail.

FIG. 6 illustrates the authentication operation 510 of FIG. 4 in example embodiments in more detail. In example embodiments, the terminal device 10 provides credentials to an authentication interface 2104 of the server 21 to request at operation 5102.

In example embodiments, authentication interface 2104 authenticates the user device 10 by comparing credentials provided by the terminal device 10 to known input credentials at operation 5104. In example embodiments, the terminal device 10 may include an input ID, stored on the device 10. The input ID may be credentials for accessing an e-mail account, for example, the login and a password, or credentials, for example, a user name and password, for accessing a social media site.

In the event the credentials match, the authentication interface 2104 may grant access to further print options to the terminal device 10 at operation 5106. In the event that the credentials do not match, the authentication interface 2104 may indicate to the terminal device 10 such and/or terminate the attempted transaction. As described above, the authentication operation may be omitted.

Figure 7:
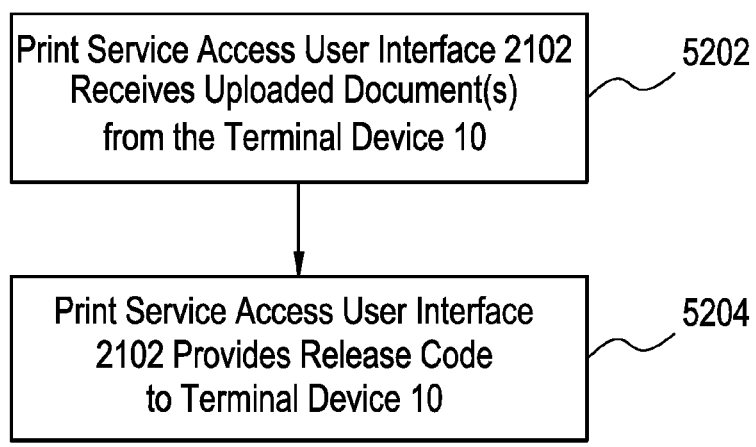
FIG. 7 illustrates the document upload operation of FIG. 4 in example embodiments in more detail.

FIG. 7 illustrates the document upload operation 520 of FIG. 4 in example embodiments in more detail. In example embodiments, once the terminal device 10 is authenticated, the user of the terminal device 10 identifies a document or documents, either stored on the terminal device 10 or accessible to the terminal device 10 and uploads the document or documents for which cloud printing is requested to a print service access user interface 2102 of the server 21 at operation 5202.

In return, the terminal device 10 receives information associated with the print job from the print service access user interface 2102 to enable the user of the terminal device 10 to print the print job at operation 5204. In example embodiments, the information associated with the print job is a release code that the user of the terminal device 10 may take to the print apparatus 30 and enter therein on order to obtain the print job.

In other example embodiments, the information associated with the print job may be held until monetary payment is confirmed, as discussed below.

Figure 8:
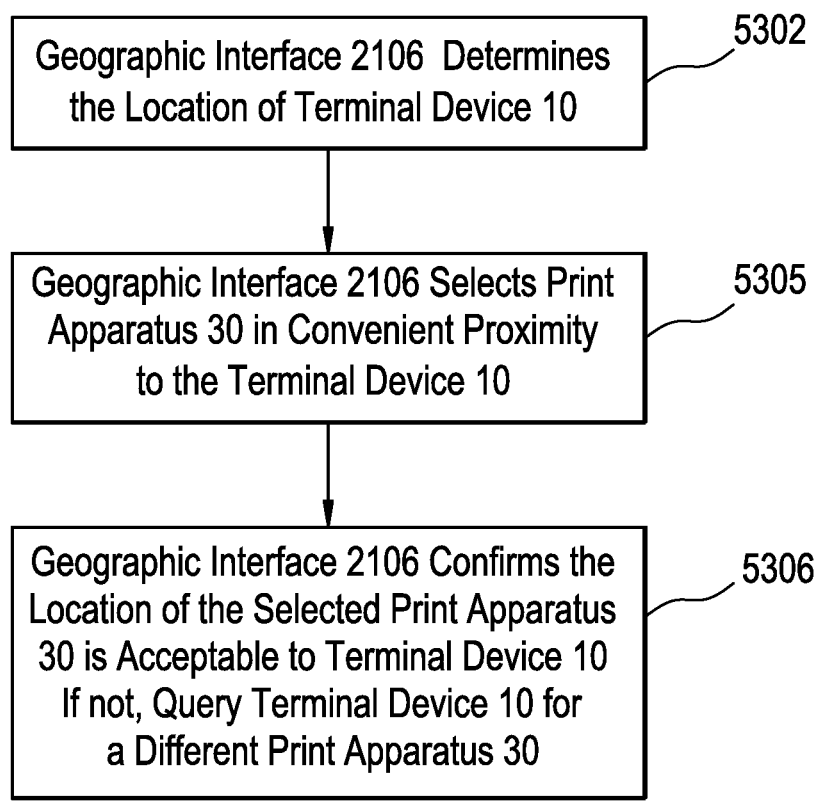
FIG. 8 illustrates the detect location operation of FIG. 4 in example embodiments in more detail.

FIG. 8 illustrates the detect location operation 530 of FIG. 4 in example embodiments in more detail. In example embodiments, a geographic interface 2106 of the server 21 determines the location of the terminal device 10 at operation 5302. In operation 5304, the geographic interface 2106 selects a print apparatus 30 among the print apparatuses 30 within the cloud 20 for printing the user's print job. In example embodiments, the location of the selected print apparatus 30 is in convenient geographical proximity to the location of the user of the terminal device 10.

At operation 5306, the geographic interface 2106 may optionally confirm the acceptability of the selected print apparatus 30 with the user of the terminal device 10 and/or query the user of the terminal device 10 for a desirable print location.

In operation 5302, the geographic interface 2106 may determine the location of the terminal device 10 in several ways. In example embodiments, the geographic interface 2106 may also obtain global positioning information (GPS information) from the terminal device 10, and select the print apparatus 30 from the system 100, which is geographically close to the current location of the user of the device 10, as indicated by the GPS information.

In other example embodiments, in the event GPS or other real time geographic information is not available about the user of the device 10, the geographic interface 2106 may access other location information about the user of the terminal device 10 or the terminal device 10 itself. For example, the geographic interface 2106 may select a print apparatus 30 which is geographically close to a physical address that matches the IP address of the terminal device 10. In other example embodiments, the geographic interface 2106 may identify a print apparatus 30, which is geographically close to a billing address for a user of the terminal device 10.

Figure 9:
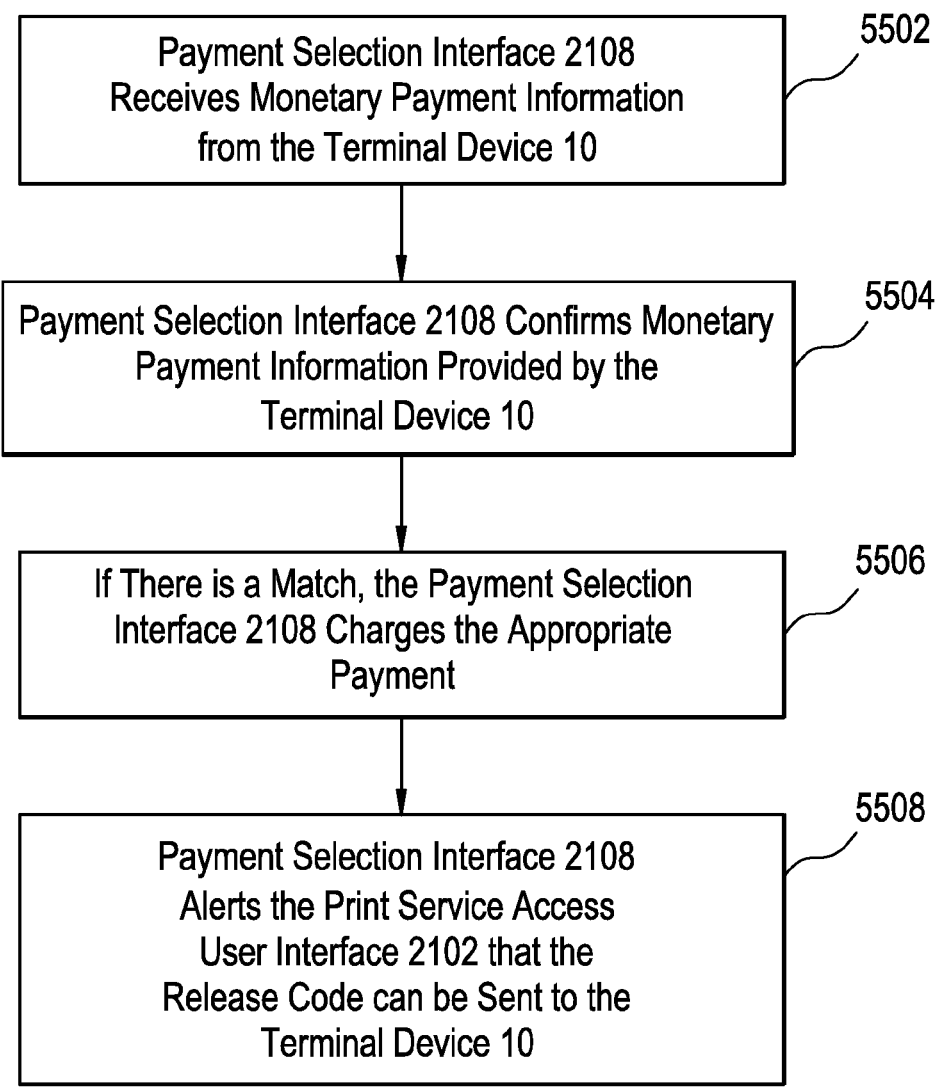
FIG. 9 illustrates the payment collection operation of FIG. 4 in example embodiments in more detail.

FIG. 9 illustrates the payment collection operation 550 of FIG. 4 in example embodiments in more detail. In example embodiments, if the user of the terminal device 10 has chosen the pay-to-print option in operation 540 of FIG. 4, the user then provides payment information at operation 5502 via a payment selection interface 2108 of the server 21. In example embodiments the user of the terminal device 10 may be capable of transmitting a payment method, in the form of a credit card, debit card, direct withdrawal account, or other third party account, either directly or via one or more third parties to payment selection interface 2108 of the server 21.

In operation 5504, the payment selection interface 2108 confirms the payment information provided and at operation 5506, if the payment information is confirmed, the payment selection interface 2108 makes the appropriate charge.

In example embodiments, at operation 5508, the payment selection interface 2108 may notify the print service access user interface 2102 that payment is confirmed, and then the print service access user interface 2102 may generate the information associated with the print job and send the information associated with the print job to enable the user of the terminal device 10 to print the print job. As stated above, the information associated with the print job may be a release code that the user of the terminal device 10 may take to the print apparatus 30 and enter therein on order to obtain the print job.

In example embodiments, the payment selection interface 2108 may store the user payment information for future use. In other example embodiments, the payment selection interface 2108 need not store the user payment information.

Figure 10:
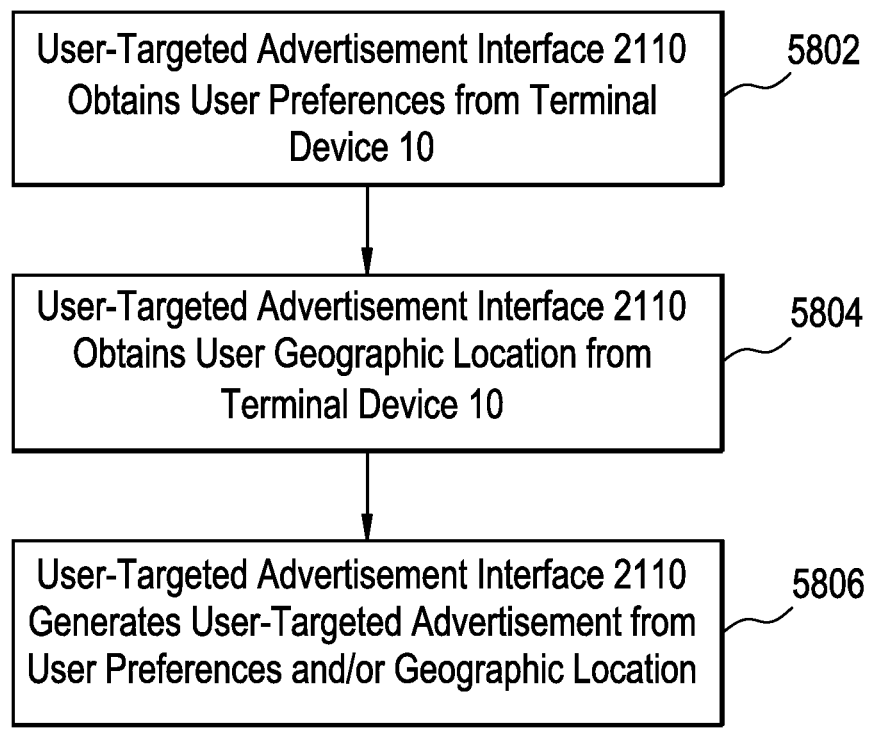
FIG. 10 illustrates the user-targeted advertisement generation operation of FIG. 4 in example embodiments in more detail.

FIG. 10 illustrates the user-targeted advertisement generation operation 580 of FIG. 4 in example embodiments in more detail. In example embodiments, if the user of the terminal device 10 has chosen the free-print-with-advertisement option in operation 540 of FIG. 4, the payment selection interface 2108 send an indication to the user-targeted advertisement interface 2110 to generate the user-targeted advertisement.

In operation 5802, the user-targeted advertisement interface 2110 retrieves user preference information from the user of the terminal device 10 via the network 15. In example embodiments, the user-targeted advertisement interface 2110 retrieves user information from an e-mail account or a social media site and generates advertising information which relates to personal interests of the user of the terminal device 10.

In operation 5804, the user-targeted advertisement interface 2110 retrieves geographic information from the user of the terminal device 10 via the network 15 or from the geographic interface 2106.

In operation 5804, in example embodiments, the user-targeted advertisement interface 2110 uses the personal interests of the user to generate a user-targeted advertisement targeted specifically to the interests of the user of the terminal device 10. For example, if one of the user's retrieved personal interests is home improvement, the user-targeted advertisement may be directed to a home improvement store or website.

In other example embodiments, the user-targeted advertisement interface 2110 uses the geographic information of the user to generate a user-targeted advertisement targeted specifically to the location of the user of the terminal device 10. For example, if the user of the terminal device 10 in is convenient proximity to any type of establishment, for example, a restaurant, shop, store, café, grocery store, etc., the user-targeted advertisement may be an advertisement for one of the those establishments.

In still other example embodiments, the user-targeted advertisement interface 2110 uses the personal interests and geographic information to generate a user-targeted advertisement targeted specifically to the user of the terminal device 10. For example, if one of the user's retrieved personal interests is home improvement, the user-targeted advertisement may be directed to a home improvement store within convenient proximity to the user of the terminal device 10.

Although example embodiments discussed above are directed to home improvement, other personal interests may be used, for example, outdoor activities/camping equipment, sporting goods, electronics, photography, beauty products, famous designer brands, and restaurants.

In example embodiments, the user-targeted advertisement interface 2110 sends the user-targeted advertisement to the payment selection interface 2108 and/or the print service access user interface 2102.

FIG. 11 illustrates the print operation 570 of FIG. 4 in example embodiments in more detail. In example embodiments, at 5702, the print service access user interface 2102 sends the uploaded print job to the user interface 302 of the selected print apparatus 30 unmodified if the user has chosen the pay-to-print option. At 5704, the print service access user interface 2102 sends the uploaded print job to the user interface 302 of the selected print apparatus 30 modified with the user-targeted advertisement, if the user has chosen the free-print-with-advertisement option.

In example embodiments, the print service access user interface 2102 send the information associated with the print job (release code) to the selected print apparatus 30 at operation 5706. At 5708, the user of the terminal device 10 enters the information associated with the print job (release code) provided to the terminal device 10 by the print service access user interface 2102 at the selected print apparatus 30. If the release code entered by the user matches the release code provided to the selected printer 30 by the print service access user interface 2102, then the selected print apparatus prints the print job. In example embodiments, if the user has chosen the pay-to-print option, the print job is printed unmodified; if the user has chosen the free-print-with-advertisement, the print job is printed, modified with the user-targeted advertisement.

Figure 12A:
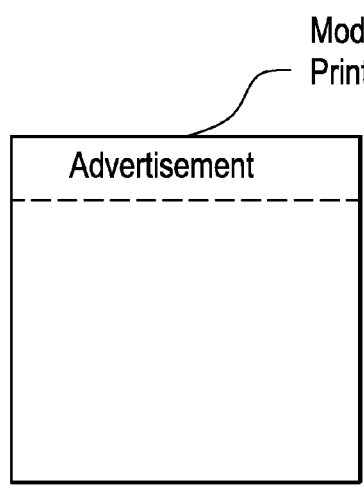
FIGS. 12a-12d illustrate several modified print jobs with user-targeted advertisements thereon.
Figure 12B:
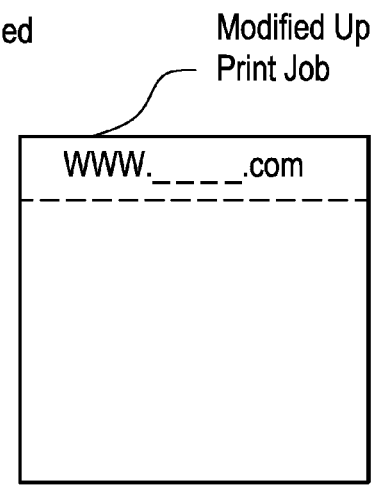
Figure 12C:
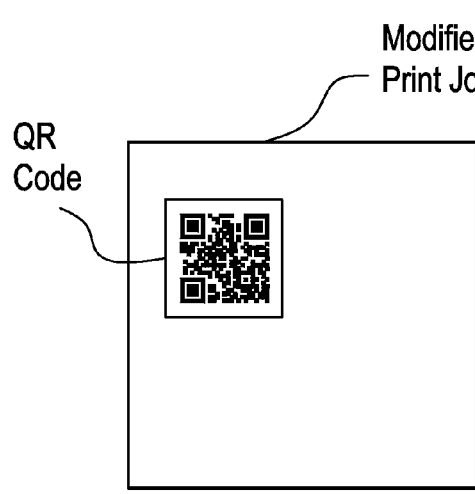
Figure 12D:
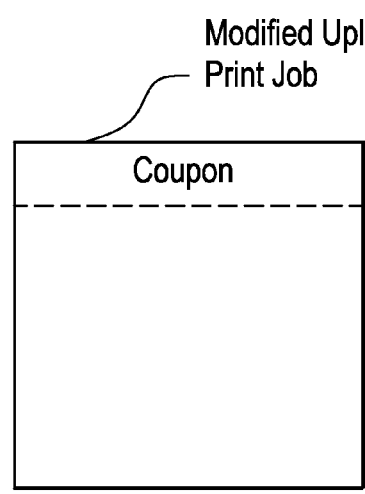

In example embodiments as shown in FIG. 12a, the user-targeted advertisement is printed on the print job as a printed ad. Alternatively, as shown in FIG. 12b, the user-targeted advertisement may be a link to an establishment's website. Alternatively, as shown in FIG. 12c, the user-targeted advertisement may be printed as a barcode, for example, a quick response (QR) code which the user may read with the terminal device 10 in order to go to a website to learn more about the advertiser's products. In other example embodiments, the embedded QR code may include social media or e-mail account information so when the QR code is read, one can tell who saw the user-targeted advertisement and where. In other example embodiments as shown in FIG. 12d, the advertisement may be a coupon which the user of the device 10 may take to the establishment for a rebate or discount.

In example embodiments, once the modified uploaded print job is printed, the selected print apparatus 30 may capture time, location, and/or document information, in order to obtain some information for future use on the behavior of the user of the terminal device 10.

In each of the above examples, use of the user-targeted advertisements illustrated in FIGS. 12a-12d by the user of the device 10 may be recorded so that the operator of the server 21 may be compensated for displaying the user-targeted advertisement and/or for a portion of the amount spent by the user at the establishment.

In summary in example embodiments as set forth above, a user may choose a payment option of pay-to-print or free-print-with advertisement. In example embodiments, the user can log on, for example, via a major single sign-on, such as an e-mail account and/or social media account, within the terminal device 10's application. In example embodiments, the user sends the print job to the cloud server to print when uploading the job to the cloud, the cloud can retrieve personal interests and behavior from e-mail accounts or social media sites, and add that personal interest of the user's printing mobile device to GPS and retrieve detailed ads, such as local restaurants and/or local shops. In other example embodiments, where real time GPS information is not available, the user's IP address may be used for a general location.

As set forth above, in example embodiments, the advertisement may have a barcode thereon or a QR code embedded therein. The QR code may include GPS and/or user information and/or user e-mail and/or social media information. When the user reads the QR code and goes to the sponsor website, the information will be sent to the sponsor. Additionally, the sponsor may compensate the operator of server 21, with additional revenue based on the reading of the QR code.

Those of ordinary skill in the art will readily recognize numerous additional or equivalent messages as well as other orderings or sequences of the messages shown in FIGS. 4 and 6 through 11. Such alternative, equivalent, and additional messages are omitted herein for simplicity and brevity of this discussion.

Example embodiments of the invention can take the form of an entirely hardware embodiment, an entirely software embodiment or an embodiment containing both hardware and software elements. In example embodiment, the invention is implemented in software, which includes but is not limited to firmware, resident software, microcode, etc.

Furthermore, example embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be a non-transitory medium, for example, an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Those of ordinary skill in the art will further readily recognize numerous standard programming and interface techniques to obtain information from the selected print apparatus regarding its present configuration. Some controllers of selected print apparatus (e.g., controllers of multi-function printers) are essentially fully functional computing devices that include an object-oriented operating system that, in turn, provides a number of standard object access methods for additional programming features to access printing system information. For example, the operating system of the MFP controller may provide a programming interface (i.e., an application programming interface or API) implementing a Java or JavaScript API.

The foregoing is illustrative of example embodiments and is not to be construed as limiting thereof. Although example embodiments have been described, those of ordinary skill in the art will readily appreciate that many modifications are possible in the example embodiments without materially departing from the novel teachings and advantages of the example embodiments. Accordingly, all such modifications are intended to be included within the scope of the claims. Example embodiments are defined by the following claims, with equivalents of the claims to be included therein.

What is claimed is:
1. A system for providing a cloud print service, the system comprising:
a print apparatus connected to a public network; and
a print service provider connected to the public network, the print service provider configured to, provide a print service access user interface through the public network to a terminal device, receive and store a print job uploaded, via the public network, from the terminal device to the print service access user interface, provide, via the public network, a payment selection interface to the terminal device, the payment selection interface enabling a user of the terminal device to enter a user selection to select one of a pay-to-print option and a free-print-with-advertisement option, collect, via the public network, a monetary payment from the user, if the user selection is the pay-to-print option, generate a user-targeted advertisement based on user preference information retrieved from one of e-mail and social media accounts associated with the user of the terminal device and modify the uploaded print job to include the user-targeted advertisement therein, if the user selection is the free-print-with-advisement option, transmit, via the public network, first information associated with the print job to the terminal device, if the user provides the monetary payment or selects the free-print with-advertisement option, and transmit, via the public network, one of the uploaded print job and the modified uploaded print job to the print apparatus based on the user selection, if the print apparatus provides the print service provider with second information that matches the first information, wherein the print apparatus includes a printer user interface configured to, receive, via the printer user interface, second information associated with the print job from the user of the terminal device, transmit, via the public network, the second information to the print service provider, receive, via the public network, the print job from the print service provider, if the print service provider determines that the first information matches the second information, and process the print job to generate a print output based on the processed print job.

2. The system of claim 1, wherein the first information associated with the print job is a release code that is transmitted via the public network to the user terminal.

3. The system of claim 1, wherein the user-targeted advertisement is printed on the print output.

4. The system of claim 1, wherein the user-targeted advertisement includes a bar code symbol.

5. The system of claim 4, wherein the bar code symbol is a quick response (QR) symbol that links to an advertiser website.

6. The system of claim 1, wherein the user-targeted advertisement includes a coupon redeemable at an advertiser establishment.

7. The system of claim 1, wherein the print service access user interface includes an authentication interface configured to receive user credentials of the user from the terminal device via the public network and authenticate the user.

8. The system of claim 7, wherein the user credentials are a login and password.

9. The system of claim 1, wherein the print service access user interface includes a geographic interface configured to receive user geographic information of the user from the terminal device via the public network.

10. The system of claim 9, wherein the print service provider is configured to select the print apparatus from a plurality of available print apparatuses of the cloud print service based on the user geographic information from the geographic interface.

11. The system of claim 9, wherein the geographic interface determines the user geographic information by at least one of internet protocol (IP) address and mobile device billing address.

12. The system of claim 9, wherein the geographic interface determines the user geographic information by real-time position information.

13. The system of claim 1, wherein the payment selection interface includes a payment interface configured to receive user payment information from the terminal device via the public network when the user selects the pay-to-print option.

14. The system of claim 1, wherein the payment selection interface includes a user-targeted advertisement interface configured to, receive user preference information from the terminal device via the public network, and select the user-targeted advertisement based on the user preference information when the user selects the free-print-with-advertisement option.

15. The system of claim 14, wherein the user preference information is collected from the user.

16. The system of claim 14, wherein the print service access user interface further includes a geographic interface configured to, receive user geographic information of the user from the terminal device via the public network, and select the user-targeted advertisement based on the user geographic information.

17. The system of claim 1, wherein the payment interface further configured to receive monetary payment from the advertiser of the user-targeted advertisement in exchange for the user-targeted advertisement.

18. A method of printing to a cloud print service, the method comprising:

receiving and storing a print job uploaded, via a public network, from a terminal device;

providing, via the public network, a payment selection interface to the terminal device, the payment selection interface enabling a user of the terminal device to enter a user selection to select one of a pay-to-print option and a free-print-with-advertisement option;

collecting, via the public network, a monetary payment from the user, if the user selection is the pay-to-print option;

generating a user-targeted advertisement based on user preference information retrieved from one of e-mail and social media accounts associated with the user of the terminal device and modifying the uploaded print job to include the user-targeted advertisement therein, if the user selection is the free-print-with-advisement option transmitting, via the public network, first information associated with the print job to the terminal device, if the user provides the monetary payment or selects the free-print with-advertisement option; and transmitting, via the public network, one of the uploaded print job and the modified uploaded print job to a print apparatus based on the user selection, if the print apparatus provides the print service provider with second information that matches the first information.

19. A non-transitory computer-readable medium comprising software code thereon which, when executed by a computer, configures the computer to:
- receive and store a print job uploaded, via a public network, from a terminal device,
- providing, via the public network, a payment selection interface to the terminal device, the payment selection interface enabling a user of the terminal device to enter a user selection to select one of a pay-to-print option and a free-print-with-advertisement option,
- collect, via the public network, a monetary payment from the user, if the user selection is the pay-to-print option,
- generate a user-targeted advertisement based on user preference information retrieved from one of e-mail and social media accounts associated with the user of the terminal device and modify the uploaded print job to include the user-targeted advertisement therein, if the user selection is the free-print-with-advisement option
- transmit, via the public network, first information associated with the print job to the terminal device, if the user provides the monetary payment or selects the free-print with-advertisement option, and
- transmit, via the public network, one of the uploaded print job and the modified uploaded print job to a print apparatus based on the user selection, if the print apparatus provides the print service provider with second information that matches the first information.

* * * * *